Figures 1, 2:
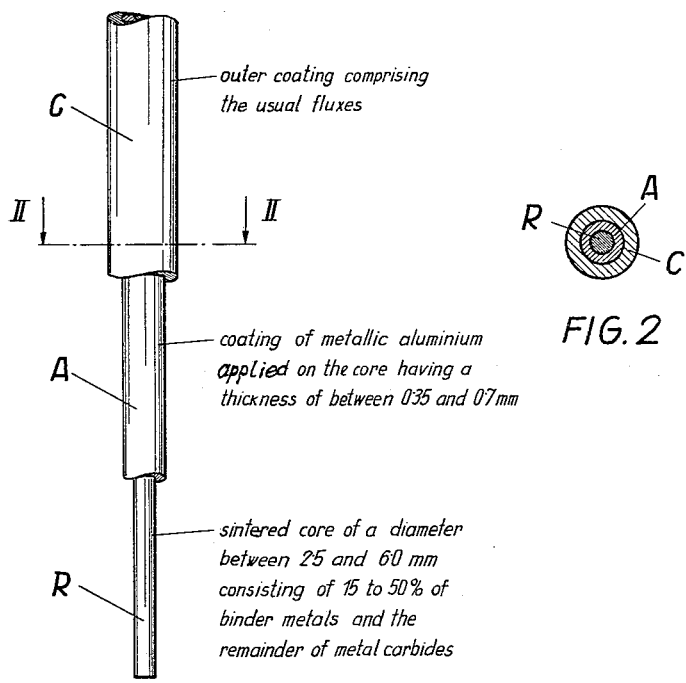

3,004,873
COATED WELDING ELECTRODE FOR
ELECTRIC ARC WELDING
Harald Strohmeier, Kapfenberg, and Wilfried Mader, Kapfenberg-Hafendorf, Austria, assignors to Gebr. Bohler & Co. Aktiengesellschaft, Vienna, Austria
Filed July 6, 1959, Ser. No. 824,913
Claims priority, application Austria July 5, 1958
9 Claims. (Cl. 117—204)

The present invention relates to improvements in the known coated welding electrodes having a core of sintered carbide material.

In welding work using such electrodes, inferior deposits may result because owing to the low electrical conductivity of the sintered carbide rod the temperature thereof rises so strongly that it becomes soft and breaks. Besides, the coating composition applied suffers a premature decomposition at this high temperature or spalls from the core wire.

The action of oxygen on the melting particles is also extremely detrimental to the quality of the weld.

In order to enable a satisfactory welding with these electrodes it has already been proposed to provide the core material with a metallic inner covering of high electrical conductivity. It is suitable to use for this inner coating a metal such as aluminum which has a strong deoxidizing activity but burns up entirely so that it does not alloy the deposited weld material. Such alloying would also reduce the quality of the deposits and would particularly reduce the wear resistance thereof.

Another highly disturbing disadvantage of these electrodes is their extremely high tendency to fracture, which requires special precautions during the manufacture and, above all, during welding. The sintered carbide electrode cores have usually diameters between 2.5 mm. and 6.0 mm. and lengths up to 400 mm.

The invention is clearly illustrated in the accompanying drawings, in which:

FIGURE 1 is a side elevational view of the improved electrode constructed in accordance with the invention, with legends applied thereto, and FIGURE 2 is a cross section taken on the line II—II in the direction in which the arrows point.

Referring more particularly to the drawing, the same consists of a sintered core R having an inner coating A of metallic aluminum applied on the core and surrounded in turn by an outer coating C comprising the usual fluxes.

According to the invention it has been found that this tendency to fracture can be reduced to a tolerable degree if the inner coating of metallic aluminum is extruded in a thickness of 0.35–0.70 mm. on the electrode core. Electrode cores having a comparatively smaller diameter will obviously require a relatively thicker coating to obtain the same resistance to fracture.

In the core diameter range between 2.5 mm. and 6.0 mm. these coatings 0.35–0.70 mm. thick can be extruded on sintered carbide material consisting of 15–50% binder metal of the iron group and of tungsten carbide. These sintered carbides may also contain up to 10% of one or more of the carbides of the metals Cr, Ta, Nb, and V and/or up to 15% titanium carbide.

The binder metal of the iron group may comprise any of the metals iron, nickel, and cobalt and these metals may also be used in the form of mixtures or alloys with each other. It may be particularly suitable to select a binder metal having such a composition that the mixing thereof with the base metal used during welding results in a weld base material having the composition of an austenitic steel.

Particularly good results have been obtained with binder metals which consist of nickel in an amount of 5–15% and iron in an amount of 5–20%, balance substantially cobalt.

The outer coating of the welding electrodes according to the invention may comprise the usual fluxes. Good results have been obtained particularly with calcium-base fluxes.

Such outer coatings may consist, e.g., of

25–50 parts $CaCo_3$
20–40 parts $CaF_2$
2–15 parts ferro alloys
10–25 parts carbon In addition to the usual fluxes the outer coating may also contain in a manner known per se sintered carbides and/or binder metal in powder form to influence the composition of the weld.

We claim:

1. A coated welding electrode for electric arc welding having a sintered core of a diameter between 2.5 and 6.0 mm., a coating thereon of extruded metallic aluminum having a thickness of between 0.35 and 0.7 mm., the sintered core consisting of 15 to 50% of binder metals selected from the group consisting of iron, cobalt and nickel, and the remainder of metal carbides selected from the group of metals consisting of tungsten, titanium, chromium, tantalum, columbium and vanadium.

2. The electrode of claim 1, in which the sintered core consists of 15 to 50% of the binder metals, the balance tungsten carbide.

3. The electrode of claim 1, in which the sintered core consists of 15 to 50% of the binder metals, up to 10% of metal carbides selected from the group of metal carbides of chromium, tantalum, columbium, the balance tungsten carbide.

4. The electrode of claim 1, in which the metal carbides contain up to 15% of titanium carbide.

5. A coated welding electrode as set forth in claim 1, in which said binder metal consists of 5–15% nickel, 5–20% iron, balance substantially cobalt.

6. A coated welding electrode as set forth in claim 1, which comprises an outer coating surrounding said inner coating and consisting of 25–50 parts $CaCO_3$, 20–40 parts $CaF_2$, 2–15 parts ferro alloys, and 10–25 parts carbon.

7. A coated welding electrode as set forth in claim 1, which comprises an outer coating containing fluxes and sintered carbide powder.

8. A coated welding electrode as set forth in claim 1, which comprises an outer coating containing fluxes and binder metal powder.

9. A coated welding electrode as set forth in claim 1, which comprises an outer coating containing fluxes, sintered carbide powder and binder metal powder.

References Cited in the file of this patent

UNITED STATES PATENTS

| | | |
|---|---|---|
| 1,613,942 | Davies | Jan. 11, 1927 |
| 2,024,992 | Wissler et al. | Dec. 17, 1935 |
| 2,189,387 | Wissler | Feb. 6, 1940 |

FOREIGN PATENTS

| | | |
|---|---|---|
| 188,179 | Austria | Jan. 10, 1957 |